US009075423B2

(12) United States Patent
Zhu et al.

(10) Patent No.: US 9,075,423 B2
(45) Date of Patent: Jul. 7, 2015

(54) GENERATING A REGULATED SIGNAL FROM ANOTHER REGULATED SIGNAL

(75) Inventors: Liang Zhu, Shenzhen (CN); Jun Liu, Shenzhen (CN); Hai Bo Zhang, Shenzhen (CN)

(73) Assignee: STMicroelectronics (Shenzhen) R&D Co. Ltd, Shenzhen (CN)

( * ) Notice: Subject to any disclaimer, the term of this patent is extended or adjusted under 35 U.S.C. 154(b) by 453 days.

(21) Appl. No.: 12/859,478

(22) Filed: Aug. 19, 2010

(65) Prior Publication Data

US 2011/0156676 A1 Jun. 30, 2011

(30) Foreign Application Priority Data

Dec. 31, 2009 (CN) .......................... 2009 1 0265994

(51) Int. Cl.
*G05F 1/577* (2006.01)
*G05F 1/575* (2006.01)
*H02M 3/145* (2006.01)

(52) U.S. Cl.
CPC ...................................... *G05F 1/575* (2013.01)

(58) Field of Classification Search
CPC ............. H02M 2001/0025; H02M 2001/0067; H02M 1/14; H02M 3/145; H02M 3/155; H02M 3/156; H02M 3/158
USPC .................. 323/225, 266, 268, 269, 271, 350
See application file for complete search history.

(56) References Cited

U.S. PATENT DOCUMENTS 4,536,700 A * 8/1985 Bello et al. .................... 323/285
4,629,970 A * 12/1986 Johansson ..................... 323/285
6,307,356 B1 * 10/2001 Dwelley ........................ 323/282
6,713,992 B2 * 3/2004 Matsuo et al. ................ 323/266
6,850,044 B2 * 2/2005 Hansen et al. ................ 323/266
6,900,621 B1 * 5/2005 Gunther ........................ 323/266
7,071,660 B2 * 7/2006 Xu et al. ........................ 323/266
7,173,400 B2 * 2/2007 Morioka ........................ 323/266
7,834,600 B2 * 11/2010 Bassett et al. ................ 323/265
2005/0242792 A1 * 11/2005 Zinn ............................ 323/268

FOREIGN PATENT DOCUMENTS

CN 102117087 7/2011
EP 1439444 7/2004
EP 1536549 9/2005

OTHER PUBLICATIONS

Maxim, Application Note 2031, "DC-DC Converter Tutorial", http://www.maxim-ic.com/an2031, Oct. 19, 2000, pp. 13.
STOD1412, "Step-up and inverting DC-DC converter", www.st.com, Aug. 2007, pp. 21.

* cited by examiner

*Primary Examiner* — Gary L Laxton
(74) *Attorney, Agent, or Firm* — Gardere Wynne Sewell LLP

(57) ABSTRACT

An embodiment of a method includes generating a regulated output signal from a regulated intermediate signal in response to a reference signal and the regulated output signal, and generating the regulated intermediate signal from an input signal in response to the regulated output signal and the regulated intermediate signal. By generating one regulated signal (e.g., a regulated output voltage) from another regulated signal (e.g., a regulated intermediate voltage), the magnitude of the ripple component of the one regulated signal may be reduced. Furthermore, by generating the regulated intermediate signal in response to the regulated output signal, the efficiency of the regulation may be increased.

30 Claims, 5 Drawing Sheets

GENERATING A REGULATED SIGNAL FROM ANOTHER REGULATED SIGNAL

PRIORITY CLAIM

The instant application claims priority to Chinese Patent Application No. 200910265994.9, filed Dec. 31, 2009, which application is incorporated herein by reference in its entirety.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

An embodiment includes generating a regulated output signal from a regulated intermediate signal in response to a reference signal and the regulated output signal, and generating the regulated intermediate signal from an input signal in response to the regulated output signal and the regulated intermediate signal.

By generating one regulated signal (e.g., a regulated output voltage) from another regulated signal (e.g., a regulated intermediate voltage), one may significantly reduce the magnitude of the ripple component of the one regulated signal as compared to a conventional regulation technique.

Furthermore, by generating the regulated intermediate signal in response to the regulated output signal, one may significantly increase the efficiency of the regulation as compared to a conventional regulation technique.

DETAILED DESCRIPTION

Figure 1:
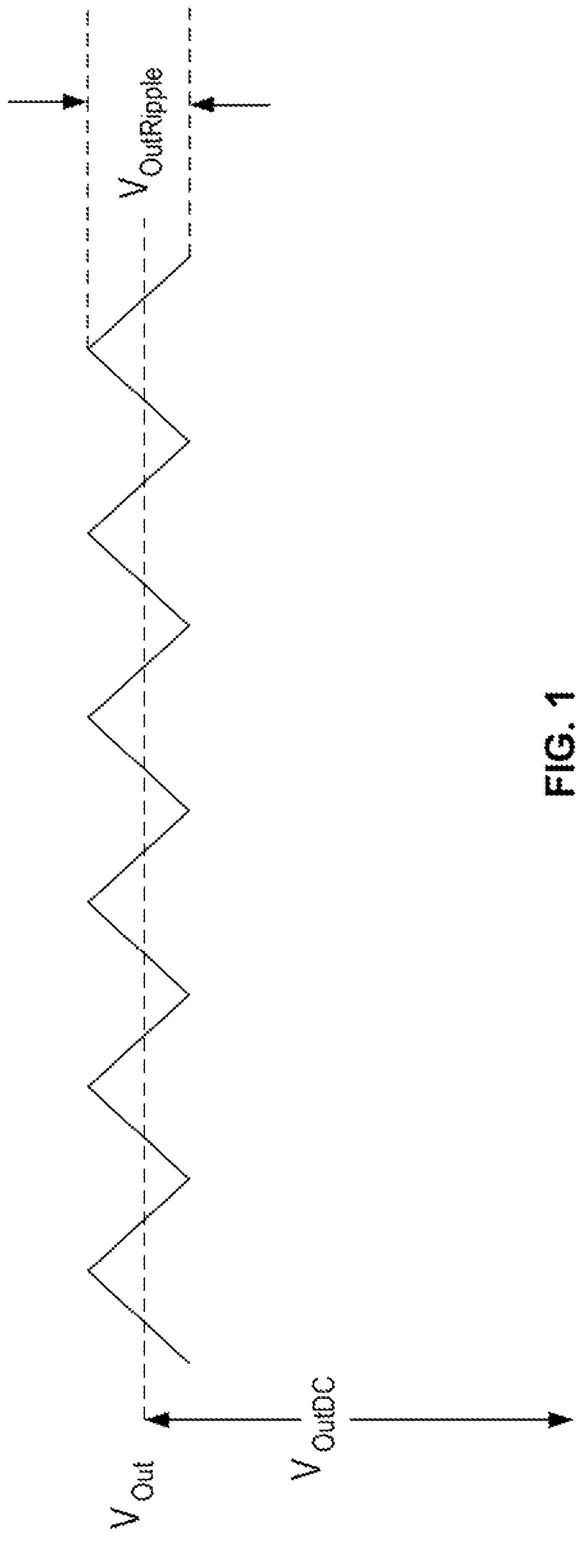
FIG. 1 is a plot of an embodiment of a regulated output signal having a ripple component.

FIG. 1 is a plot of a regulated output voltage $V_{out}$ generated by an embodiment of a switching power supply (not shown). $V_{out}$ has an average (DC) component having a magnitude $V_{outDC}$, and a ripple component having a peak-to-peak magnitude $V_{outripple}$. The ripple component results from the switching action of the power supply. Although the ripple component is described as having rising and falling portions of the same duration and having respective slopes of the same magnitude, the rising and falling portions may have different durations or different slope magnitudes. Furthermore, although described as being constant, the slopes may be non-constant.

For a conventional switching power supply, $V_{outripple}$ may be in a range of approximately 7 millivolts (mV)-50 mV.

But unfortunately, this range for $V_{outripple}$ may be unsuitable for some applications, such as for powering an active-matrix organic-light-emitting-diode (AMOLED) display.

Furthermore, a switching power supply with a relatively low efficiency, for example less than 80%, may be unsuitable for some applications, such as low-power or "green" applications. The efficiency of a power supply may be defined as the ratio of the power delivered (output power) by the power supply to the power input (input power) to the power supply.

Figure 2:
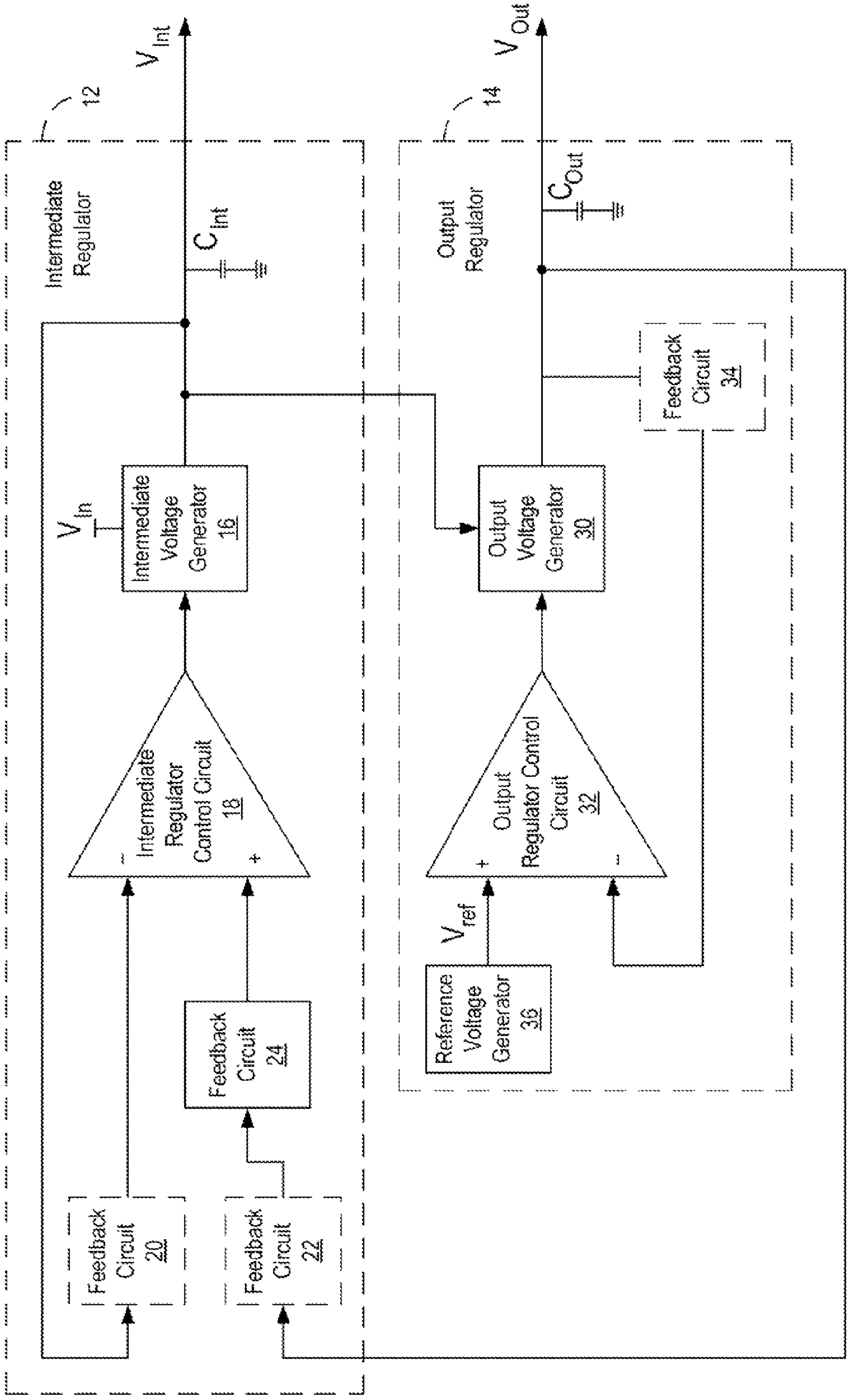
FIG. 2 is a schematic block diagram of an embodiment of a power supply.

FIG. 2 is a schematic block diagram of an embodiment of a switching power supply 10, which may generate a regulated output voltage Vout having a ripple component $V_{outripple}$ (not shown in FIG. 2) of a reduced magnitude, and which may have an increased efficiency, as compared to a conventional switching power supply. For example, the component $V_{outripple}$ generated by the supply 10 may be approximately 10-100 times less than the component $V_{outripple}$ generated by a conventional switching power supply, and the efficiency of the supply 10 may be within or above a range of approximately 80%-90% at maximum load.

Still referring to FIG. 2, the power supply 10 includes an intermediate regulator 12 and an output regulator 14, which generates Vout having a reduced Voutripple.

The intermediate regulator 12 includes an intermediate-voltage generator 16, an intermediate-regulator control circuit 18, an optional intermediate feedback circuit 20, an optional output feedback circuit 22, an offset feedback circuit 24, and a filter capacitor $C_{int}$.

The intermediate-voltage generator 16 includes circuitry for generating a regulated intermediate voltage $V_{int}$ from an input voltage $V_{in}$ in response to at least one control signal from the intermediate-regulator control circuit 18. For example, the generator 16 may include conventional buck-converter circuitry for generating the magnitude of the DC component ($V_{intDC}$) of $V_{int}$ less than the magnitude of the DC component ($V_{intDC}$) of $V_{in}$. Or, the generator 16 may include conventional buck-boost-converter circuitry for generating the magnitude of $V_{intDC}$ greater than the magnitude of $V_{inDC}$.

The intermediate feedback circuit 20 generates an intermediate feedback voltage from $V_{int}$. In an embodiment, the feedback circuit 20 may include a voltage divider. And in an embodiment where the feedback circuit 20 is omitted, $V_{int}$ may be coupled directly to the intermediate-regulator control circuit 18.

The output feedback circuit 22 generates an output feedback voltage from $V_{out}$. In an embodiment, the feedback circuit 20 may include a voltage divider. And in an embodiment where the feedback circuit 22 is omitted, $V_{out}$ may be coupled directly to the offset feedback circuit 24.

In an embodiment, the offset feedback circuit 24 adjusts the output feedback voltage from the feedback circuit 22 by adding an offset voltage to the output feedback voltage to generate an offset feedback voltage. As discussed below, the offset voltage may set the efficiency of the power supply 10 by setting a difference between $V_{intDC}$ and $V_{outDC}$, which are the DC components of $V_{int}$ and $V_{out}$.

The intermediate-regulator control circuit 18 includes an inverting node that receives the intermediate feedback signal from the intermediate feedback circuit 20, includes a noninverting node that receives the offset feedback signal from the offset feedback circuit 24, and generates the at least one control signal for the generator 16 in response to the intermediate and offset feedback signals. In an embodiment, the intermediate feedback signal is proportional to $V_{int}$, and the offset feedback signal acts as a reference signal. Therefore, if $V_{intDC}$ the DC component of $V_{int}$ becomes larger than a value set by the offset and intermediate feedback signals, then the control circuit 18 reduces the switching duty cycle of the voltage generator 16 so as to reduce $V_{intDC}$ back toward the set value. Conversely, if $V_{intDC}$ becomes smaller than the set value, then the control circuit 18 increases the switching duty cycle of the voltage generator 16 so as to increase $V_{intDC}$ back toward the set value. Furthermore, in an embodiment where the offset feedback signal is proportional to $V_{out}$, the effective reference signal for the intermediate regulator 12, and thus $V_{int}$, tracks $V_{out}$. As discussed below, tracking $V_{int}$ to $V_{out}$ may allow the power supply 10 to have and maintain a suitable level of efficiency even if $V_{out}$ changes.

The filter capacitor $C_{int}$ may affect the magnitude of the ripple component $V_{intripple}$ of $V_{int}$, and may also be used to compensate the feedback loop of the intermediate regulator 12.

The output regulator 14 includes an output-voltage generator 30, an output-regulator control circuit 32, an optional feedback circuit 34, a reference-voltage generator 36, and a filter capacitor $C_{out}$.

The output-voltage generator 30 includes circuitry for generating the regulated output voltage $V_{out}$ from the regulated intermediate voltage $V_{int}$ in response to at least one control signal from the output-regulator control circuit 32. For example, the generator 30 may include conventional low-drop-out (LDO) regulator circuitry for generating $V_{outDC}$ (the DC component of $V_{out}$) less than $V_{intDC}$ (the magnitude of the DC component of $V_{int}$).

The feedback circuit 34 generates a feedback voltage from $V_{out}$. In an embodiment, the feedback circuit 34 may include a voltage divider. And in an embodiment where the feedback circuit 34 is omitted, $V_{out}$ may be coupled directly to the output-regulator control circuit 32. But one may set $V_{out}$ to a desired value by designing the feedback circuit 34 to generate a feedback signal of an appropriate level.

The output-regulator control circuit 32 includes an inverting node that receives the feedback signal from the feedback circuit 34, includes a noninverting node that receives the reference voltage $V_{ref}$ from the generator 36, and generates the at least one control signal for the output-voltage generator 30 in response to the feedback signal and $V_{ref}$. Therefore, if $V_{outDC}$ becomes larger than a level set by $V_{ref}$ and the feedback circuit 34, then the control circuit 32 causes the voltage generator 30 to reduce $V_{outDC}$ back toward the set value. Conversely, if $V_{outDC}$ becomes smaller than the set value, then the control circuit 32 causes the voltage generator 30 to increase $V_{outDC}$ back toward the set value.

The filter capacitor $C_{int}$ may affect the magnitude of the ripple component $V_{outripple}$ of $V_{out}$, and may also be used to compensate the feedback loop of the output regulator 14.

Still referring to FIG. 2, the operation of an embodiment of the power supply 10 is described.

The intermediate-regulator control circuit 18 causes the intermediate voltage generator 16 to generate $V_{int}$ such that the voltage at the noninverting node of the control circuit 18 substantially equals the voltage at the inverting node of the control circuit 18. For example, where the feedback circuits 20 and 22 multiply $V_{int}$ and $V_{out}$ by the same factor, then this causes $V_{intDC} \approx V_{outDC}$ $V_{offset}$, where $V_{offset}$ is the offset voltage added by the offset feedback circuit 24.

In an embodiment where the intermediate voltage generator 16 includes switching circuitry, $V_{int}$ also has a ripple component $V_{intripple}$. For example, the peak-to-peak magnitude of $V_{intripple}$ may be in the range of approximately 5-100 mV.

The output-regulator control circuit 32 causes the output-voltage generator 30 to generate $V_{out}$ such that the voltage at the inverting node of the control circuit 32 substantially equals the voltage at the noninverting node of the control circuit. For example, where the feedback circuit 34 is omitted, then this causes $V_{outDC} \approx V_{ref}$.

In an embodiment, the output-voltage generator 30 does not generate a ripple component on $V_{out}$, and the power-supply rejection ratio (PSSR) of the generator 30 reduces the ripple component $V_{intripple}$ from $V_{int}$ such that the ripple component $V_{outripple}$ is significantly less than the ripple component $V_{intripple}$. For example, where the output-voltage generator 30 includes LDO circuitry, then the magnitude of peak-to-peak $V_{outripple}$ may be approximately 10-100 times less than the peak-to-peak magnitude of $V_{intripple}$.

Furthermore, where the output-voltage generator 30 includes LDO circuitry, then, $V_{int}$ is greater than $V_{out}$.

But the efficiency of the supply 10 is inversely proportional to $V_{int}-V_{out}$. That is, the greater the difference between $V_{int}$ and $V_{out}$, the lower the efficiency of the supply 10.

Therefore, by adding $V_{offset}$ with the feedback circuit 24, one may set the difference between $V_{int}$ and $V_{out\ to\ be}$ sufficiently large to allow for proper operation of the output-voltage generator 30, but to be sufficiently small to impart a suitable level of efficiency to the supply 10.

Still referring to FIG. 2, some components of the power supply 10 may be disposed within a power-supply-controller integrated circuit (IC) (single or multiple dies) that may be provided separately from the other components of the power supply. For example, the control circuits 18 and 32 may be disposed within the power-supply controller IC, and the other components may be provided as discrete components or within one or more other ICs. Alternatively, more or all of the components of the power supply 10 may be disposed within a single IC. For example, all of the components of the power supply 10 except for $C_{int}$, $C_{out}$, and the feedback circuit 34 may be disposed within the power-supply-controller IC.

Still referring to FIG. 2, alternate embodiments of the power supply 10 are contemplated. For example, any signal described as a voltage may be a current, and vice-versa. Furthermore, the supply 10 may include other components and circuits, such as, for example, an over-current protection circuit and a droop-control circuit. Moreover, the supply 10 may include more than two serially coupled regulators. For example, a third regulator (not shown) may generate an output voltage $V_{out}'$ from $V_{out}$, where $V_{out}'$ has a ripple component $V_{outripple}'$ that is smaller than $V_{outripple}$, and so on. In addition, the components of the supply 10 other than the intermediate voltage generator 16 may be powered by $V_{in}$ or by one or more other voltages. Furthermore, although described as generating a positive voltage $V_{out}$, the power supply 10 may be modified to generate a negative voltage $V_{out}$.

Figure 3:
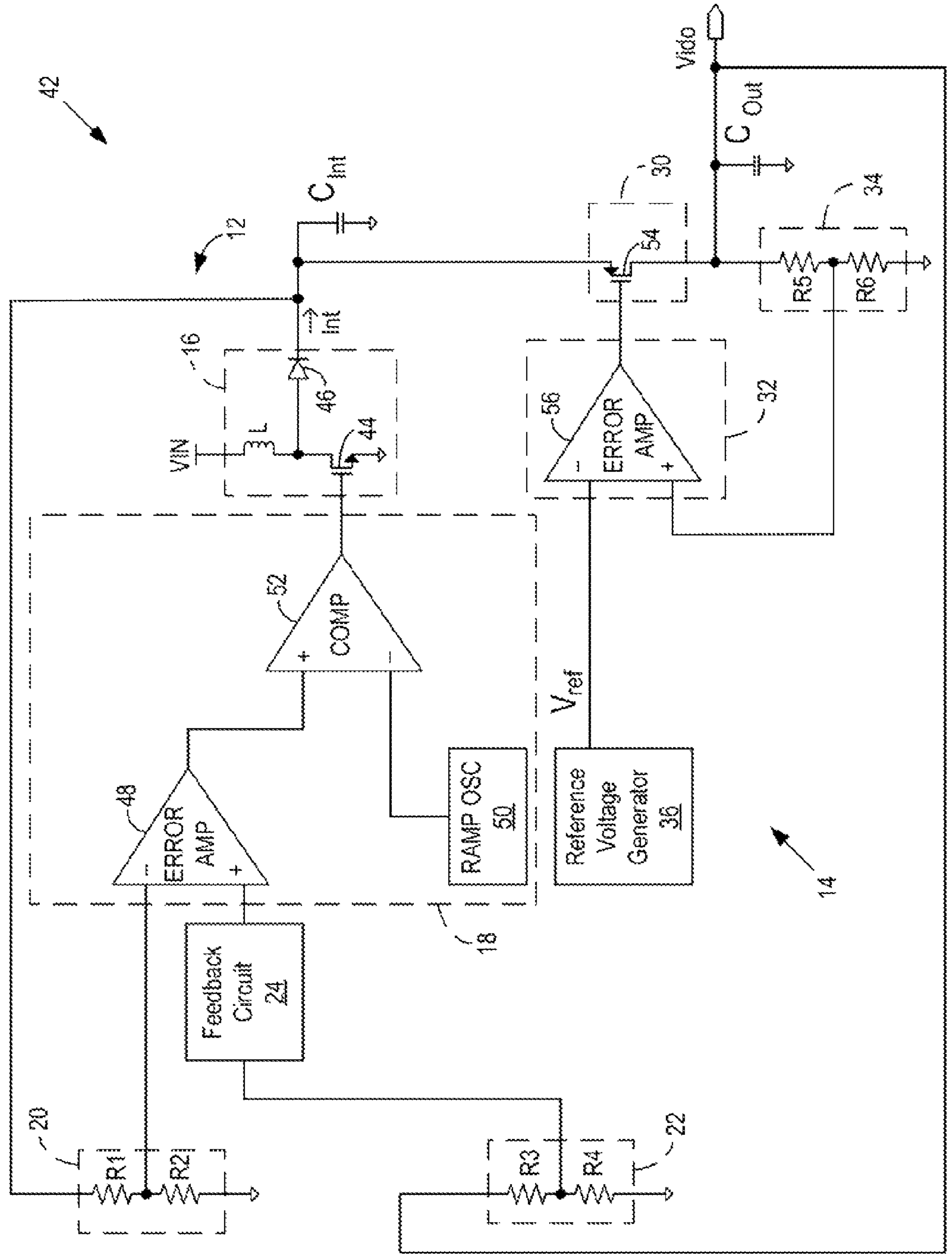
FIG. 3 is a schematic diagram of an embodiment of the power supply of FIG. 2.

FIG. 3 is a schematic diagram of an embodiment of a switching power supply 42 in which like numerals are used to reference components common to the power supply 10 of FIG. 2. Like the power supply 10, the power supply 42 may generate a regulated output voltage $V_{out}$ having a ripple component $V_{outripple}$ (not shown in FIG. 3) of a reduced magnitude, and may have an increased efficiency, as compared to a conventional switching power supply. For example, the ripple component $V_{outripple}$ generated by the supply 42 may be approximately 10-100 times less than the output ripple component generated by a conventional switching power supply, and the efficiency of the supply 40 may be within or above a range of approximately 80%-90% at maximum load.

Like the power supply 10, the power supply 42 includes the intermediate regulator 12 and the output regulator 14, which generates $V_{out}$ having a reduced $V_{outripple}$.

The intermediate-voltage generator 16 of the intermediate regulator 12 is a buck-boost circuit that includes an inductor L, an NMOS transistor 44, and a diode 46. As discussed below, the buck-boost circuit 16 generates $V_{int}$ to have a DC component $V_{intDC}$ that is higher than V. Alternatively, the diode 46 may be replaced by another NMOS transistor that is operated to prevent current from flowing from $C_{int}$ back toward the inductor L.

The intermediate-regulator control circuit 18 includes an error amplifier 48, a ramp oscillator 50, and a comparator 52. The error amplifier 48 includes an inverting node that receives the intermediate feedback signal from the intermediate feedback circuit 20, includes a noninverting node that receives the offset feedback signal from the offset feedback circuit 24, and generates an error signal in response to the intermediate and offset feedback signals. The ramp oscillator 50 generates a periodic signal, for example, a triangle wave. The comparator receives the error signal on a noninverting node and the periodic signal from the ramp oscillator 50 on an inverting node, and generates a control signal in response to the comparison of the error and periodic signals. Therefore, if $V_{intDC}$ (the DC component of $V_{int}$) becomes larger than a value set by the offset and intermediate feedback signals, then the error amplifier 48, ramp oscillator 50, and the comparator 52 cooperate to reduce the switching duty cycle of the transistor 44 so as to reduce $V_{intDC}$ back toward the set value. Conversely, if $V_{intDC}$ becomes smaller than the set value, then the error amplifier 48, ramp oscillator 50, and the comparator 52 cooperate to increase the duty cycle of the transistor 44 so as to increase $V_{intDC}$ back toward the set value. As discussed above, where the offset feedback signal from the feedback circuit 24 is proportional to $V_{out}$, $V_{int}$ tracks $V_{out}$.

The feedback circuit 20 includes a voltage divider formed by resistors R1 and R2, the feedback circuit 22 includes a voltage divider formed by resistors R3 and R4, and the feedback circuit 24 operates in a manner similar to that described above in conjunction with the power supply 10 of FIG. 2.

The output-voltage generator 30 of the output regulator 14 includes LDO circuitry in the form of a PMOS pass transistor 54 for generating the regulated output voltage $V_{out}$ from the regulated intermediate voltage $V_{int}$. As described below, the transistor 54 generates $V_{outDC}$ the DC component of $V_{out}$ to be less than of $V_{intDC}$.

The output-regulator control circuit 32 includes an error amplifier 56 that has a noninverting node that receives the feedback signal from the feedback circuit 34, has an inverting node that receives the reference voltage $V_{ref}$ from the generator 36, and that generates a control signal for controlling the conductivity of the transistor 54 in response to the feedback signal and $V_{ref}$—the polarities of the error-amplifier input nodes are reversed relative to the output-regulator control circuit 32 of the power supply 10 of FIG. 2 to compensate for of the signal inversion caused by the PMOS transistor 54. Therefore, if $V_{outDC}$(the DC component of $v_{out}$) becomes larger than a value set by $V_{ref}$ and the feedback circuit 34, then the error amplifier 56 reduces the conductivity of the transistor 54 to reduce $V_{outDC}$ back toward the set value. Conversely, if $V_{outDC}$ becomes smaller than the set value, then the error amplifier 56 increases the conductivity of the transistor 54 to increase $V_{outDC}$ back toward the set value.

The feedback circuit 34 includes a voltage divider formed by resistors R5 and R6

And the reference-voltage generator 36 operates in a manner similar to that described above in conjunction with the power supply 10 of FIG. 2 to generate $V_{ref}$.

Still referring to FIG. 3, the operation of an embodiment of the power supply 42 is described for R1=R3=604 KΩ, R2=R4=50 KΩ, R5=1.15 MΩ, R6=100 KΩ, $V_{ref}$=0.8 V, Vin=3.7 V, and for where the offset feedback circuit 24 adds a level of $V_{offset}$ to the output of the feedback circuit 22, such that $V_{outDC}$ (the DC component of $V_{out}$) equals approximately 10.0 V.

$V_{intripple}$ (the ripple component of $V_{int}$) in the steady-state is given by the following equation:

$$V_{int\ ripple} = \frac{I_{int}}{C_{int} f} \cdot D \quad (1)$$

where $I_{int}$ is the steady-state current delivered by the generator 16, f is the steady-state switching frequency of the transistor 44 as set by the ramp oscillator 50, and D is the steady-state duty cycle of the transistor 44. For example, in an embodiment where $I_{int}$=60 milliamps (mA), f=1.2 MHz, D=0.7, and $V_{intripple}$≈7.5 mV.

The error amplifier 48, ramp oscillator 50, and comparator 52 cooperate to cause the transistor 44, inductor L, and diode 46 to generate $V_{int}$ such that $V_{intDC}$×R2/(R1+R2)≈$V_{outDC}$×R4/(R3+R4)+$V_{offset}$. Because R2/(R1+R2)=R4/(R3+R4)=(50 KΩ)/654 KΩ)≈0.076, then:

$$V_{intDC}=V_{outDC}+V_{offset} \quad (2)$$

Furthermore, as discussed below, the efficiency of the output voltage generator 30 is related to $V_{offset}$.

The error amplifier 56 causes the pass transistor 54 to generate $V_{out}$ such that the voltage at the noninverting node of the error amplifier 56 substantially equals the voltage at the inverting node of the error amplifier 56. Therefore, where $V_{ref}$=0.8 V, then $V_{outDC}$×R6/(R5+R6)≈$V_{ref}$≈0.8 V, such that:

$$V_{outDC} \approx V_{ref} \times (R5+R6)/R6 \approx 0.8\ V \times (1.25\ \text{M}\Omega)/(100\ \text{K}\Omega) \approx 10.0\ V \quad (3)$$

A designer may select the difference between $V_{outDC}$ and $V_{intDC}$ ($V_{intDC}$−$V_{outDC}$) high enough to provide sufficient "head room" to allow the pass transistor 54 to generate a regulated $V_{out}$ from $V_{int}$, but low enough to reduce the voltage drop across the transistor 54 to a value that allows the power supply 42 to operate with a suitable efficiency. In an embodiment, setting $V_{intDC}$−$V_{outDC}$≈200 mV provides sufficient head room, yet allows the power supply 42 to operate with steady-state efficiency within or above a range of approximately 80%-90%.

From equation (2) and $V_{intDC}$−$V_{outDC}$=200 mV, then:

$$V_{offset}=0.076(V_{intDC}-V_{outDC})=0.076\times 200\ \text{mV}\approx 15.2\ \text{mV} \quad (4)$$

Furthermore, in an embodiment, the PSSR of the output regulator 14 as formed by the divider 54 transistor 54, and error amplifier 56 is sufficient to filter $V_{int}$ such that $V_{outripple}$ (the ripple component of $V_{out}$) has a peak-to-peak amplitude of approximately 0.2 mV, which is approximately 40 times less than the approximately 7.5 mV peak-to-peak amplitude of $V_{intripple}$ (the ripple component of $V_{int}$).

Still referring to FIG. 3, some components of the power supply 42 may be disposed on a power-supply controller integrated circuit (IC) (single or multiple dies) that may be provided separately from the other components of the power supply. For example, all of the components of the power supply 42 but for the inductor L, the capacitors $C_{int}$ and $C_{out}$, and the resistors R5 and R6 may be disposed on the power-supply controller IC, and L, $C_{int}$, $C_{out}$, R5, and R6 may be discrete components or disposed on one or more other ICs. In such an embodiment, a designer need only select the values of R5 and R6 that give the desired level of $V_{out}$. Because the level of $V_{offset}$ depends only on the values of R1-R4, the power-supply controller IC automatically maintains the difference $V_{intDC}-V_{outDC}$ at a value that provides a suitable resolution headroom and efficiency.

Still referring to FIG. 3, alternate embodiments of the power supply 42 are contemplated. For example, one or more of the alternate embodiments discussed above for the power supply 10 of FIG. 2 may be contemplated for the power supply 42. Furthermore, the transistors 44 and 54 may be other than NMOS and PMOS transistors, respectively. Moreover, one or more of the resistors R1-R6 may be implemented with an other component, such as with a transistor.

Figure 4:
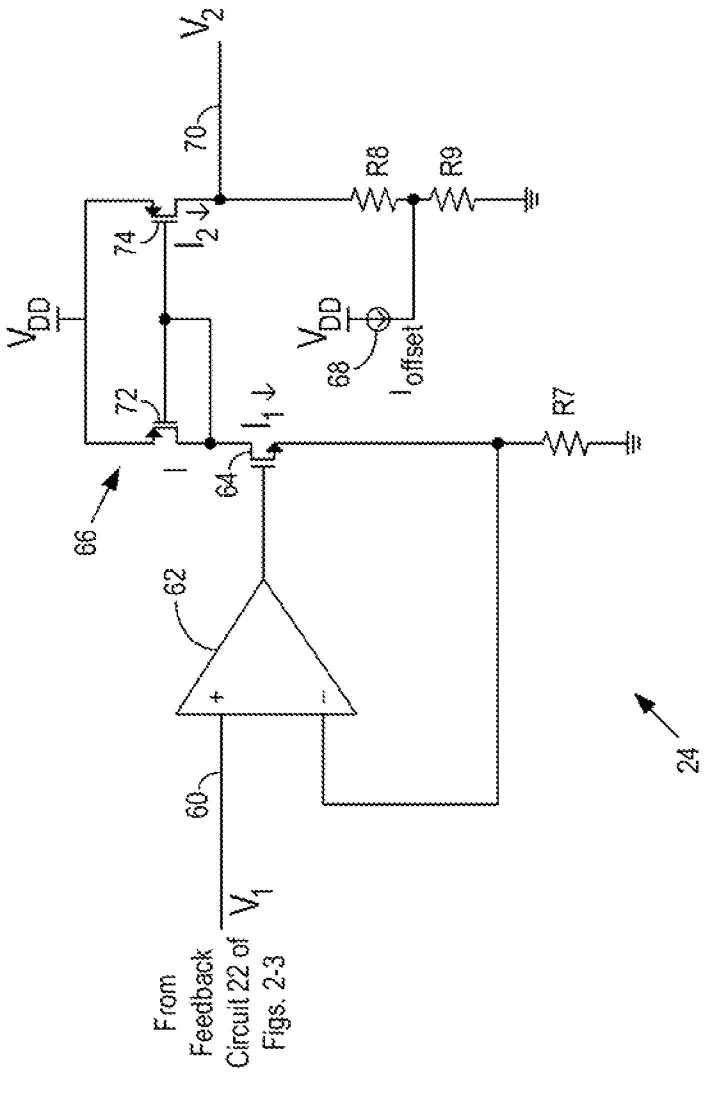
FIG. 4 is schematic diagram of an embodiment of the offset feedback circuit of FIGS. 2 and 3.

FIG. 4 is a schematic diagram of an embodiment of the offset feedback circuit 24 of FIGS. 2 and 3.

The feedback circuit 24 includes an input node 60, a unity-gain buffer 62, an NMOS transistor 64, a resistor R7, a current mirror 66, a current source 68 operable to generate an offset current $I_{offset}$, resistors R8 and R9 where R7≈R8+R9, and an output node 70. The current mirror includes a diode-connected PMOS input transistor 72, and a PMOS output transistor 74 having approximately the same width-length ratio as the transistor 72.

In operation, the feedback circuit 24 receives a voltage V1 (e.g., from the node between R1 and R2 of FIG. 3) at the input node 60, which is coupled to the noninverting input node of the buffer 62. In response to $V_1$, the buffer 62 causes the transistor 64 to draw a current $I_1$ such that a voltage approximately equal to V1 is across the resistor R7.

The current mirror 66 receives I1 at is input and generates an output current I2 at its output, such that I2≈I1

Therefore, because R8+R9≈R7 and I2≈I1, the voltage V2 at the output node 70 is approximately equal to the voltage V1 at the input node 60 when offset=0.

But where $I_{offset}\neq 0$, the circuit 24 adds an offset voltage $V_{offset}$ to the output node 70, such that $V2=V_1+V_{offset}$, where $V_{offset}$ is given by the following equation:

$$V_{offset}=I_{offset}\times R9 \quad (5)$$

Therefore, a designer may select $I_{offset}$ and R9 to generate a suitable value for $V_{offset}$.

Alternate embodiments of the offset feedback circuit 24 are contemplated. For example, one or more of the alternate embodiments described above in conjunction with the power supplies 10 and 42 of FIGS. 2 and 3 may be applicable to the circuit 24. Furthermore, the circuit 24 may include an output buffer coupled to the output node 70. Moreover, although described as generating a positive voltage level for $V_{offset}$, the circuit 24 may be designed to generate a negative voltage level for $V_{offset}$. In addition, the transistors 72 and 74 may be other than PMOS transistors. Furthermore, the supply voltage VDD may be equal to Vin (FIGS. 2 and 3), derived from Vin, or derived from another voltage source.

Figure 5:
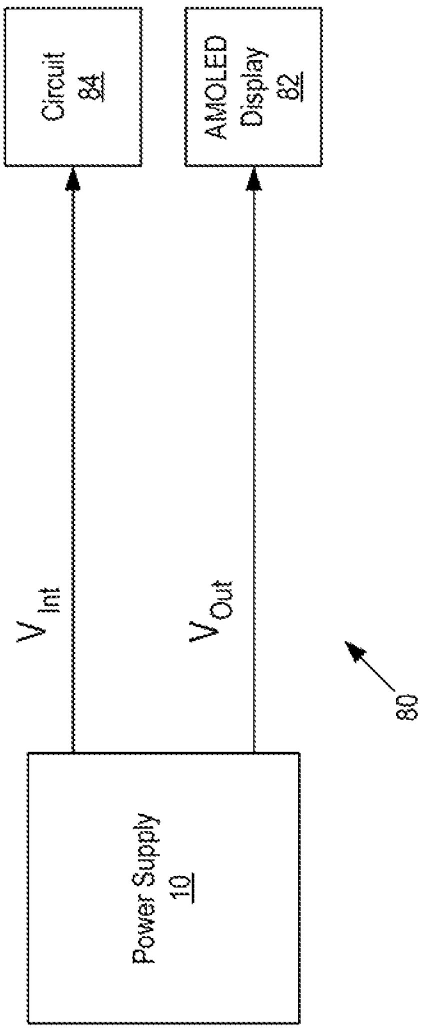
FIG. 5 is a block diagram of a system that incorporates an embodiment of the power supply of FIG. 2 or an embodiment of the power supply of FIG. 3.

FIG. 5 is a block diagram of a system 80 that may incorporate one or more of the power supplies 10 and 42 of FIGS. 2 and 3. For example purposes, however, the system 80 is described as including one power supply 10.

In addition to the power supply 10, the system 80 includes a first integrated circuit, such as an AMOLED display 82, which is at least partially powered by $V_{out}$ from the power supply.

The system 80 may also include a second integrated circuit, such as a controller 84, that is at least partially powered by $V_{int}$ from the power supply 10. For example, the controller 84 may be able to tolerate the higher (as compared to $V_{outripple}$) ripple component $V_{intripple}$ of $V_{int}$.

The display 82, the controller 84, and at least a portion of the power supply 10 may be disposed on a same integrated-circuit die, on respective integrated-circuit dies, or otherwise on multiple integrated-circuit dies.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A power supply controller, comprising:

an output regulator control circuit configured to cause a low dropout output-signal generator to generate a regulated output signal from a regulated intermediate signal in response to a reference signal and in response to a regulated output feedback signal;

an intermediate regulator control circuit coupled to the output regulator control circuit and configured to cause an intermediate buck or buck-boost signal generator to generate the regulated intermediate signal from an input signal in response to the regulated output feedback signal and the regulated intermediate signal; and an offset feedback circuit coupled between the intermediate regulator control circuit and the output regulator control circuit and configured to adjust the regulated output feedback signal.

2. The power supply controller of claim 1 wherein the output regulator control circuit is configured to cause the low dropout output signal generator to generate the regulated output signal in response to a feedback signal derived from the regulated output signal.

3. The power supply controller of claim 1 wherein the intermediate regulator control circuit is configured to cause the intermediate buck or buck-boost signal generator to generate the regulated intermediate signal in response to a feedback signal derived from the regulated output signal.

4. The power supply controller of claim 1 wherein the intermediate regulator control circuit is configured to cause the intermediate buck or buck-boost signal generator to generate the regulated intermediate signal in response to a feedback signal derived from the regulated intermediate signal.

5. The power supply controller of claim 1 wherein the intermediate regulator control circuit is configured to cause the intermediate buck or buck-boost signal generator to generate the regulated intermediate signal in response to a first feedback signal derived from the regulated output signal and from a second feedback signal derived from the regulated intermediate signal.

6. The power supply controller of claim 1, further comprising:

a feedback circuit configured to generate a feedback signal from the regulated output signal; and wherein the intermediate regulator control circuit is configured to cause the intermediate buck or buck-boost signal generator to generate the regulated intermediate signal in response to the feedback signal.

7. The power supply controller of claim 1, further comprising:

a feedback circuit configured to generate a feedback signal from the regulated intermediate signal; and wherein the intermediate regulator control circuit is configured to cause the intermediate buck or buck-boost signal generator to generate the regulated intermediate signal in response to the feedback signal.

8. The power supply controller of claim 1 wherein the output regulator control circuit is configured to cause the low dropout output signal generator to generate the regulated output signal having a level that is less than a level of the regulated intermediate signal.

9. The power supply controller of claim 1, further comprising:

a feedback circuit configured to generate a feedback signal from the regulated output signal and from an adjust signal; and wherein the intermediate regulator control circuit is configured to cause the intermediate buck or buck-boost signal generator to generate the regulated intermediate signal in response to the feedback signal.

10. The power supply controller of claim 1, further comprising:

a first feedback circuit configured to generate a first feedback signal from the regulated output signal;

a second feedback circuit configured to generate a second feedback signal from the first feedback signal and from an adjust signal; and wherein the intermediate regulator control circuit is configured to cause the intermediate buck or buck-boost signal generator to generate the regulated intermediate signal in response to the second feedback signal.

11. The power supply controller of claim 1, further comprising:

a feed back circuit configured to generate a feedback signal from the regulated output signal and from an adjust signal; and wherein the intermediate regulator control circuit is configured to cause the intermediate buck or buck-boost signal generator to generate the regulated intermediate signal in response to the feedback signal such that a difference between the regulated intermediate signal and the regulated output signal is approximately equal to the adjust signal.

12. The power supply controller of claim 1 wherein:

the intermediate regulator control circuit is configured to cause the intermediate buck or buck-boost signal generator to generate the regulated intermediate signal having an intermediate ripple component of a first magnitude; and the output regulator control circuit is configured to cause the low dropout output signal generator to generate the regulated output signal having an output ripple component of a second magnitude that is significantly smaller than the first magnitude.

13. A power supply, comprising:

a low dropout output regulator configured to generate a regulated output signal from a regulated intermediate signal in response to a reference signal and in response to a regulated output feedback signal, such that the regulated output signal is proportional to the regulated intermediate signal;

an intermediate buck or buck-boost regulator coupled to the output regulator and configured to generate the regulated intermediate signal from an input signal in response to the regulated output signal and in response to the regulated intermediate signal; and an offset feedback circuit coupled between the intermediate buck or buck-boost regulator and low dropout output regulator and configured to adjust the regulated output feedback signal.

14. The power supply of claim 13 wherein the regulated output signal comprises a regulated output voltage.

15. The power supply of claim 13 wherein the reference signal comprises a reference voltage.

16. The power supply of claim 13 wherein the regulated intermediate signal comprises a regulated intermediate voltage.

17. The power supply of claim 13 wherein the input signal comprises an input voltage.

18. The power supply of claim 13 wherein the low dropout output regulator:

comprises a feedback circuit that is configured to generate a feedback signal from the regulated output signal; and wherein the low dropout output regulator is configured to generate the regulated output signal in response to the reference signal and in response to the feedback signal.

19. The power supply of claim 13, further comprising:

an output node configured to carry the regulated output signal;

an intermediate node configured to carry the regulated intermediate signal;

an output filter coupled to the output node; and an intermediate filter coupled to the intermediate node.

20. The power supply of claim 13 wherein:

the low dropout output regulator comprises an output signal generator configured to generate the regulated output signal from the regulated intermediate signal in response to an output control signal, and an output regulator control circuit configured to generate the output control signal in response to the reference signal and the regulated output signal; and the intermediate buck or buck-boost regulator comprises an intermediate signal generator configured to generate the regulated intermediate signal from the input signal in response to an intermediate control signal, and an intermediate regulator control circuit configured to generate the intermediate control signal in response to the regulated output signal and the regulated intermediate signal.

21. The power supply of claim 20 wherein:

the output signal generator comprises a transistor having a first conduction node coupled to the intermediate node, a second conduction node coupled to the output node, and a control node; and the output regulator control circuit comprises an error amplifier configured to generate the output control signal on the control node of the transistor in response to the reference signal and the regulated output signal.

22. A power supply, comprising:

a low dropout output regulator configured to generate a regulated output signal from a regulated intermediate signal in response to a reference signal and to the regulated output signal; and an intermediate buck or buck-boost regulator configured to generate the regulated intermediate signal from an input signal in response to the regulated output signal and the regulated intermediate signal;

wherein:

the low dropout output regulator comprises an output signal generator configured to generate the regulated output signal from the regulated intermediate signal in response to an output control signal, and an output regulator control circuit configured to generate the output control signal in response to the reference signal and the regulated output signal; and the intermediate buck or buck-boost regulator comprises an intermediate signal generator configured to generate the regulated intermediate signal from the input signal in response to an intermediate control signal, and an intermediate regulator control circuit configured to generate the intermediate control signal in response to the regulated output signal and the regulated intermediate signal; and wherein:

the intermediate signal generator comprises an inductor having a first node configured to receive the input voltage and having a second node coupled to the intermediate node, and a transistor having a control node and having a conduction node coupled to the second node of the inductor; and the intermediate regulator control circuit comprises an error amplifier configured to generate an error signal in response to the regulated intermediate signal and the regulated output signal, a generator configured to generate a periodic signal, and a comparator configured to generate the intermediate control signal on the control node of the transistor in response to the error signal and the periodic signal.

23. A power supply, comprising:

a low dropout output regulator configured to generate a regulated output signal from a regulated intermediate signal in response to a reference signal and to the regulated output signal;

an intermediate buck or buck-boost regulator configured to generate the regulated intermediate signal from an input signal in response to the regulated output signal and the regulated intermediate signal; and a semiconductor die;

wherein the low dropout output regulator comprises a first feedback circuit disposed remote from the die and configured to generate a first feedback signal from the regulated output signal, an output signal generator disposed on the die and configured to generate the regulated output signal from the regulated intermediate signal in response to an output control signal, and an output regulator control circuit disposed on the die and configured to generate the output control signal in response to the reference signal and the first feedback signal; and wherein the intermediate buck or buck-boost regulator comprises a second feedback circuit disposed on the die and configured to generate a second feedback signal from the regulated intermediate signal, a third feedback circuit disposed on the die and configured to generate a third feedback signal from the regulated output signal and from an offset signal, an intermediate signal generator disposed on the die and configured the regulated intermediate signal from the input signal in response to an intermediate control signal, and an intermediate regulator control circuit disposed on the die and configured to generate the intermediate control signal in response to the second and third feedback circuits.

24. A system, comprising:

a power supply, comprising an input node configured to receive an input signal, a supply node configured to provide a regulated output signal, a low dropout output regulator coupled to the supply node and configured to generate the regulated output signal from a regulated intermediate signal in response to a reference signal and in response to a regulated output feedback signal, an intermediate buck or buck-boost regulator coupled to the input node and configured to generate the regulated intermediate signal from the input signal in response to the regulated output signal and the regulated intermediate signal, such that the regulated intermediate signal is proportional to the input signal; and an offset feedback circuit coupled between the intermediate buck or buck-boost regulator and the low dropout out regulator and configured to adjust the regulated output feedback signal; and a first integrated circuit coupled to the supply node.

25. The system of claim 24 wherein the integrated circuit and at least a portion of the power supply are disposed on a same semiconductor die.

26. The system of claim 24 wherein the integrated circuit and at least a portion of the power supply are disposed on respective semiconductor dies.

27. The system of claim 24 wherein the integrated circuit comprises a controller.

28. The system of claim 24 wherein the integrated circuit comprises an active matrix organic light emitting diode display.

29. The system of claim 24 wherein:

the power supply further comprises an intermediate node configured to carry the regulated intermediate voltage; and the first integrated circuit is coupled to the intermediate node.

30. The system of claim 24, further comprising:

wherein the power supply further comprises an intermediate node configured to carry the regulated intermediate voltage; and a second integrated circuit coupled to the intermediate node.

* * * * *